(12) United States Patent
Jones et al.

(10) Patent No.: US 9,773,134 B2
(45) Date of Patent: Sep. 26, 2017

(54) APPARATUS AND METHOD PERTAINING TO SWITCHING RFID TRANSCEIVER READ STATES

(71) Applicant: Wal-Mart Stores, Inc., Bentonville, AR (US)

(72) Inventors: Nicholaus A. Jones, Fayetteville, AR (US); Bruce W. Wilkinson, Rogers, AR (US); Abu Rasel, Rogers, AR (US)

(*) Notice: Subject to any disclaimer, the term of this patent is extended or adjusted under 35 U.S.C. 154(b) by 349 days.

(21) Appl. No.: 13/871,572

(22) Filed: Apr. 26, 2013

(65) Prior Publication Data

US 2014/0320271 A1   Oct. 30, 2014

(51) Int. Cl.
*G08B 13/14* (2006.01)
*G06K 7/10* (2006.01)

(52) U.S. Cl.
CPC .............................. *G06K 7/10297* (2013.01)

(58) Field of Classification Search
CPC .. H04Q 5/22; G06K 7/10297; G06K 7/10108; G06K 7/10128
USPC ............................................. 340/10.34, 10.5
See application file for complete search history.

(56) References Cited

U.S. PATENT DOCUMENTS

| | | | |
|---|---|---|---|
| 5,376,778 A | 12/1994 | Kreft | |
| 6,641,036 B1 | 11/2003 | Kalinowski | |
| 6,894,660 B2 | 5/2005 | Sanogo | |
| 6,946,951 B2 | 9/2005 | Cole | |
| 6,992,567 B2 | 1/2006 | Cole | |
| 7,170,415 B2 | 1/2007 | Forster | |
| 7,187,267 B2 | 3/2007 | Cole | |
| 7,187,288 B2 | 3/2007 | Mendolia | |
| 7,205,896 B2 | 4/2007 | Wu | |
| 7,221,259 B2 | 5/2007 | Cole | |
| 7,413,124 B2 * | 8/2008 | Frank et al. | 235/451 |
| 7,432,817 B2 | 10/2008 | Phipps | |
| 7,528,726 B2 | 5/2009 | Lee | |
| 7,633,394 B2 | 12/2009 | Forster | |
| 7,642,916 B2 | 1/2010 | Phipps | |
| 7,642,917 B2 | 1/2010 | Tran | |
| 7,762,472 B2 | 7/2010 | Kato | |
| 7,800,497 B2 | 9/2010 | Marusak | |

(Continued)

FOREIGN PATENT DOCUMENTS

| | | |
|---|---|---|
| CN | 101021894 | 8/2007 |
| CN | 101076644 | 11/2007 |

(Continued)

OTHER PUBLICATIONS

U.S. Appl. No. 13/870,647, filed Apr. 25, 2013, Jones.

(Continued)

*Primary Examiner* — Vernal Brown
(74) *Attorney, Agent, or Firm* — Fitch Even Tabin & Flannery LLP

(57) ABSTRACT

An apparatus (such as but not limited to an RFID tag) includes an RFID transceiver that is configured to automatically switch from a readable state to a quiescent read state upon being read and to remain in the quiescent read state at least while provisioned with reader-based power. The apparatus further includes a read-state changer disposed locally with respect to the RFID transceiver and configured to switch the RFID transceiver from the quiescent read state to the readable state notwithstanding current availability of the reader-based power.

9 Claims, 3 Drawing Sheets

(56) References Cited

U.S. PATENT DOCUMENTS

| | | |
|---|---|---|
| 7,812,729 B2 | 10/2010 | Copeland |
| 7,823,269 B2 | 11/2010 | Martin |
| 7,880,620 B2 | 2/2011 | Hatori |
| 7,973,662 B2 | 7/2011 | Phipps |
| 8,063,779 B2 | 11/2011 | Coveley |
| 8,258,958 B2 | 9/2012 | Kang |
| 8,286,884 B2 | 10/2012 | Wilkinson |
| 8,286,887 B2 | 10/2012 | Wilkinson |
| 8,410,937 B2 | 4/2013 | Collins |
| 8,505,829 B2 | 8/2013 | Wilkinson |
| 8,544,758 B2 | 10/2013 | Wilkinson |
| 8,669,915 B2 | 3/2014 | Wilkinson |
| 2002/0044058 A1* | 4/2002 | Heinrich et al. ........... 340/572.1 |
| 2003/0025636 A1 | 2/2003 | Chen |
| 2004/0046643 A1 | 3/2004 | Becker |
| 2005/0057341 A1* | 3/2005 | Roesner ..................... 340/10.33 |
| 2006/0065709 A1 | 3/2006 | Yamashita |
| 2006/0145710 A1 | 7/2006 | Puleston |
| 2006/0158311 A1 | 7/2006 | Hall |
| 2007/0026764 A1 | 2/2007 | Green |
| 2007/0096915 A1 | 5/2007 | Forster |
| 2007/0164868 A1 | 7/2007 | Deavours |
| 2007/0224939 A1 | 9/2007 | Jung |
| 2007/0290856 A1 | 12/2007 | Martin |
| 2008/0018431 A1 | 1/2008 | Turner |
| 2008/0048834 A1 | 2/2008 | Lenevez |
| 2008/0088459 A1 | 4/2008 | Martin |
| 2008/0094181 A1 | 4/2008 | Lenevez |
| 2008/0116256 A1 | 5/2008 | Martin |
| 2008/0129512 A1 | 6/2008 | Bielas |
| 2008/0129513 A1 | 6/2008 | Bielas |
| 2008/0297349 A1* | 12/2008 | Leone ........................ 340/572.1 |
| 2009/0008460 A1 | 1/2009 | Kato |
| 2009/0015480 A1 | 1/2009 | Shafer |
| 2009/0027208 A1 | 1/2009 | Martin |
| 2009/0066516 A1 | 3/2009 | Lazo |
| 2009/0108993 A1 | 4/2009 | Forster |
| 2009/0206995 A1 | 8/2009 | Forster |
| 2010/0001079 A1 | 1/2010 | Martin |
| 2010/0045025 A1 | 2/2010 | Cote |
| 2010/0060425 A1 | 3/2010 | Rodriguez |
| 2010/0079245 A1 | 4/2010 | Perng |
| 2010/0079287 A1 | 4/2010 | Forster |
| 2010/0230500 A1 | 9/2010 | Wilkinson |
| 2010/0277320 A1* | 11/2010 | Gold ................ G06K 19/07749 340/572.1 |
| 2011/0012713 A1 | 1/2011 | Wilkinson |
| 2011/0063113 A1 | 3/2011 | Hook |
| 2011/0298591 A1 | 12/2011 | Mickle |
| 2012/0013440 A1 | 1/2012 | vonBose |
| 2012/0013441 A1 | 1/2012 | Ulrich |
| 2012/0086553 A1 | 4/2012 | Wilkinson |
| 2012/0155349 A1 | 6/2012 | Bajic |
| 2012/0217307 A1 | 8/2012 | Martin |
| 2012/0274449 A1 | 11/2012 | Wilkinson |
| 2013/0040570 A1 | 2/2013 | Wilkinson |
| 2013/0043308 A1 | 2/2013 | Wilkinson |
| 2013/0206846 A1 | 8/2013 | Wilkinson |
| 2013/0299583 A1 | 11/2013 | Wilkinson |
| 2014/0266632 A1 | 9/2014 | Jones |

FOREIGN PATENT DOCUMENTS

| | | |
|---|---|---|
| GB | 2481156 | 12/2011 |
| JP | 2004046904 A | 2/2004 |
| JP | 2008158569 A | 7/2008 |
| JP | 2008162120 | 7/2008 |
| JP | 2009049763 | 3/2009 |
| KR | 200412323 Y1 | 3/2006 |
| KR | 20070026388 A | 3/2007 |
| WO | 2005073937 A2 | 8/2005 |
| WO | 2009018271 A1 | 2/2009 |
| WO | 2010104991 A2 | 9/2010 |

OTHER PUBLICATIONS

EPCGLOBAL; 'EPC(TM) Radio-Frequency Identity Protocols Class-1 Generation-2 UHF RFID Protocol for Communications at 860 MHz-960 MHz Version 1.0.9;' Specification for RFID Air Interface by EPCglobal Inc.; 94 pages; Jan. 2005.

Nikitin et al.; An Overview of Near Field UHF RFID; Feb. 2007; 8 pages; IEEE.

PCT; App. No. PCT/US2014/035479; International Search Report dated Aug. 25, 2014.

PCT; App. No. PCT/US2014/035479; Written Opinion dated Aug. 25, 2014.

RFIDSOUP.com; RFID Soup; Mar. 6, 2009; 12 pages; published at http://rfidsoup.pbwiki.com.

Swedberg, Claire; RFID Puts Salt Lake City Drivers in the Fast Lane; RFID Journal; Oct. 1, 2010; 5 pages; published at http://www.rfidjournal.com/article/view/7907.

tagsense.com, TagSene Frequently Asked Questions; Mar. 6, 2009; 3 pages; published at www.tagsense.com/ingles/faq/faq.html.

Tagsys; AK Product Datasheet; Dec. 19, 2012; 1 page; published at www.tagsysrfid.com/products-services/rfid-tags/ak.

Tagsys; AK Product Datasheet; Feb. 14, 2010; 1 page; published at webarchive.org/web/20100214004043/http://www.tagsysrfid.com/products-services/rfid-tags/ak.

Tagsys; AK5 Converted Product Specification; Oct. 2012; 2 pages; published at www.tagsysrfid.com.

Tagsys; AKTag UHF Tag Datasheet; Nov. 23, 2012; 2 pages; published at www.tagsysrfid.com.

Tagsys; UHF AK Tag; Sep. 2008; 2 pages; published at www.tagsysrfid.com.

technovelgy.com; Passive RFID Tag (or Passive Tag); Mar. 5, 2009, 5 pages; published at www.technovelgy.com.

Wikipedia; RFID; Mar. 6, 2009; 2 pages; published at http://rfidsoup.pbwiki.com.

* cited by examiner

# APPARATUS AND METHOD PERTAINING TO SWITCHING RFID TRANSCEIVER READ STATES

RELATED APPLICATION(S)

This application is related to co-pending and co-owned U.S. patent application Ser. No. 13/804,393, entitled METHOD AND APPARATUS PERTAINING TO RFID TAG-BASED USER ASSERTIONS and filed Mar. 14, 2013, which is incorporated by reference in its entirety herein.

TECHNICAL FIELD

This invention relates generally to radio-frequency identification (RFID) transceivers.

BACKGROUND

RFID tags are known in the art. These so-called tags often assume the form factor of a label or a literal "tag" but are also sometimes integrated with a host article and/or its packaging. RFID tags typically comprise an integrated circuit and one or more antennas. The integrated circuit typically carries out a variety of functions including modulating and demodulating radio frequency signals, data storage, and data processing. Some integrated circuits are active or self-powered (in whole or in part) while others are passive, being completely dependent upon an external power source (such as an RFID tag reader) to support their occasional functionality.

There are proposals to utilize RFID tags to individually identify individual items. The Electronic Product Code (EPC) as managed by EPCGlobal, Inc. represents one such effort in these regards. EPC-based RFID tags each have a unique serial number to thereby uniquely identify each tag and, by association, each item correlated on a one-for-one basis with such tags. (The corresponding document entitled EPC Radio-Frequency Identity Protocols Class-1 Generation-2 UHF RFID Protocol for Communications at 860 MHz-960 MHz Version 1.0.9 is hereby fully incorporated herein by this reference.)

Each EPC-compliant tag has two states: "A" and "B." The "A" state comprises the default state and hence represents the tag's state when initially powering up. Once a tag has been read its state changes from "A" to "B." During the "A" state a tag will respond to any reader that offers a session query. During the "B" state the tag will not again respond to a reader using the same session query.

The EPC approach also supports four session protocols that differ with respect to how a read tag persists a "B" state. In Session "0" a read tag will persist this "B" state until power is lost and then the tag reverts immediately to the "A" state. In Session "1" a read tag will persist its "B" state for a period of time ranging from 500 ms to 5 seconds and will then automatically revert to the "A" state. In Session "2" and "3" a read tag will remain in the "B" state until power is lost. Then, once power is lost, the read tag will persist its "B" state for at least an additional 2 seconds (the actual persistence duration is left to the manufacturer and can reach minutes in some cases). In many cases a system designer will choose a particular EPC session protocol and employ that session protocol throughout a given facility.

In some cases a system designer will seek to provide more-or-less ubiquitous coverage through a given facility (such as a retail store) and thereby have the theoretical ability to read an RFID tag regardless of where that tag might be located within the facility. There are numerous (and significant) challenges, unfortunately, to designing and deploying such a system. On the one hand, continuously prompting all RFID tags to constantly (or even frequently) assume an A inventory state will typically result in those RFID tags constantly being read. When the facility includes a large number of RFID tags such a situation can result in an overwhelming number of reads that can literally prevent the system from providing useful data to the system user. Such a result can arise when the RFID-tag readers employ Session 0 or 1 as described above.

On the other hand, leaving read RFID tags in the B inventory state regardless of circumstance can leave the system blind to important in-facility events as pertain to those RFID tags. Such a result can arise when the RFID-tag readers employ Session 2 or 3 as described above.

BRIEF DESCRIPTION OF THE DRAWINGS

The above needs are at least partially met through provision of the apparatus and method pertaining to switching RFID transceiver read states described in the following detailed description, particularly when studied in conjunction with the drawings, wherein.

Figure 1:
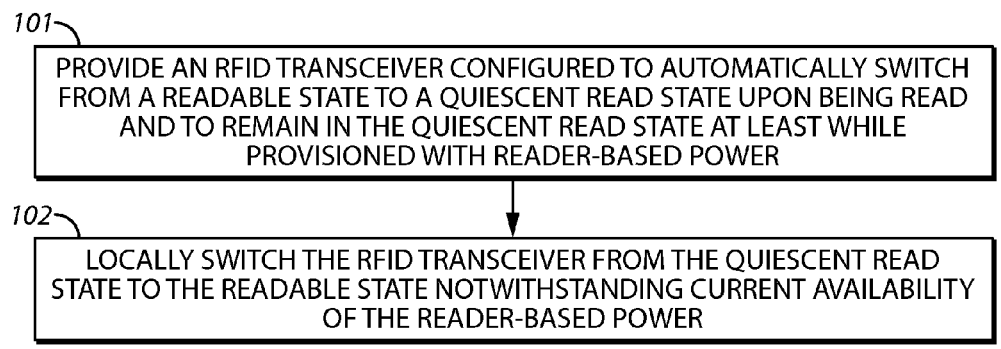
FIG. 1 comprises a flow diagram as configured in accordance with various embodiments of the invention.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments, an apparatus (such as but not limited to an RFID tag) includes an RFID transceiver that is configured to automatically switch from a readable state to a quiescent read state (that is, a state where the RFID transceiver has power but will nevertheless effectively ignore ordinary read requests) upon being read and to remain in the quiescent read state at least while provisioned with reader-based power. The apparatus further includes a read-state changer disposed locally with respect to the RFID transceiver and configured to switch the RFID transceiver from the quiescent read state to the readable state notwithstanding and regardless of the current availability of reader-based power.

These teachings are highly flexible in practice and will accommodate a wide variety of read-state changers. A non-exhaustive listing of illustrative examples in these regards includes, but is not limited to, a read-state changer that comprises any one of:

a portion of the RFID transceiver that is configured to operate in conformance with at least one of session 0 and session 1 per the EPC standard as regards persisting the quiescent read state even when the RFID transceiver is read using either of session 2 and session 3 per that standard;

a control circuit configured to switch the RFID transceiver from the quiescent read state to the readable state;

a near-field transmitter configured to transmit an instruction to the RFID transceiver to cause the RFID transceiver to switch from the quiescent read state to the readable state; and a switch to disconnect rectified power generated from the reader-based power provisioned by the RFID transceiver sufficient to cause the RFID transceiver to assume the readable state upon again be re-powered.

So configured, the RFID transceiver can interact, by design and operation, with RFID-tag reader(s) on a considerably more frequent basis than many other RFID tags in the operating environment of the apparatus. This capability, in turn, can be leveraged in various ways to facilitate and support other desired capabilities and functionality. As one simple example in these regards, such an apparatus can be assigned to and/or otherwise carried by an associate. In such a case, the apparatus can provide a very inexpensive way to facilitate wireless data communications with the associate.

Figure 2:
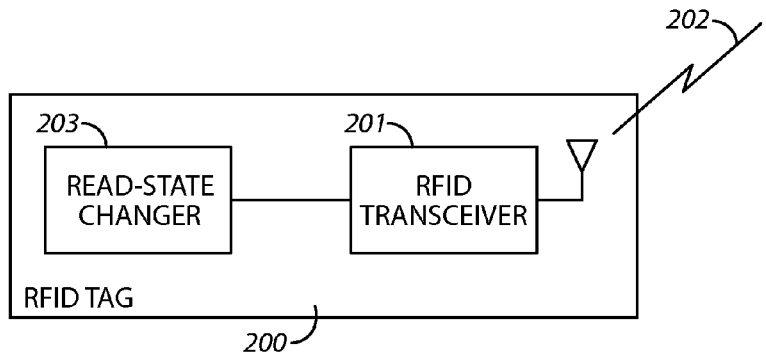
FIG. 2 comprises a block diagram as configured in accordance with various embodiments of the invention.

These and other benefits may become clearer upon making a thorough review and study of the following detailed description. Referring now to the drawings, and in particular to FIGS. 1 and 2, an illustrative process 100 that is compatible with many of these teachings will now be presented.

At 101 this process 100 provides an RFID transceiver 201 that comprises a part of, for example, an RFID tag 200. This RFID transceiver 201 is configured to automatically switch from a readable state (such as the A inventory state pursuant to the aforementioned EPC protocol) to a quiescent read state (such as the B inventory state pursuant to the aforementioned EPC protocol) upon being read and to remain in the quiescent read state at least while provisioned with reader-based power 202.

Such RFID transceivers are known in the art. For example, this RFID transceiver 201 can be configured to be read by an RFID-tag reader (not shown) that uses either of session 2 and session 3 per the standard specified by the EPC protocol. (For the sake of an illustrative example the remainder of this description will presume such a configuration to be the case. It will be understood, however, that no particular limitations are intended by this choice of an illustrative example.)

So configured, upon being read in either session 2 or session 3 (as appropriate to the application setting) the RFID transceiver 201 automatically switches from the read-ready A inventory state to the quiescent B inventory state. Absent other provisions the RFID transceiver 201 will then remain in that quiescent read state while continuing to receive reader-based power 202 as per ordinary practice in these regards.

At 201, however, a read-state changer 203 as also comprises a part of the RFID tag 200 locally switches the RFID transceiver 201 from the quiescent read state to the readable state notwithstanding current availability of the reader-based power 202. For example, by one approach the read-state changer 203 switches the RFID transceiver 201 from the B inventory state in session 2 (or session 3 as the case may be) to the A inventory state. Accordingly, the RFID transceiver 201 will now again respond to the RFID-tag reader. Upon being read, the RFID transceiver 201 will again revert to the quiescent read state.

These teachings will accommodate a variety of approaches as regards switching back and forth between read states. By one approach, for example, the read-state changer 203 operates per some predetermined schedule (such as making the switch from the quiescent read state to the readable state every 1 second, every 5 seconds, every 30 seconds, every 1 minute, every 5 minutes, or some other duration of interest). By another approach the read-state changer 203 may occasion the described switch every X seconds (or minutes, or other measure of time as may be desired) following a last switch to the quiescent read state. By yet another approach (and in lieu of the foregoing or in combination therewith as desired) the read-state changer 203 may respond instead to a user's input.

These teachings will also accommodate a variety of different read-state changers 203. Before describing some specific examples in those regards, it should be noted that the aforementioned reference to "locally" switching the RFID transceiver 201 refers to the read-state changer 203 comprising a component of and an integral part of the device that includes the RFID transceiver 201 itself (such as the described RFID tag 200). Hence, the read-state changer 203 is "local" to the RFID transceiver 201 in that the read-state changer 203 and the RFID transceiver 201 share a common platform. Accordingly, and by way of example, the read-state changer 203 could not comprise a discrete RFID-tag reader that operates independently of the RFID tag 200 as such a reader is not "local" with respect to the RFID transceiver 201.

Figure 3:
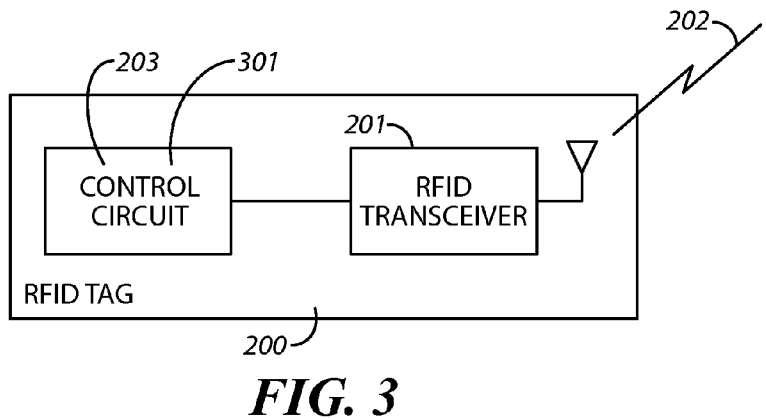
FIG. 3 comprises a block diagram as configured in accordance with various embodiments of the invention.

FIG. 3 presents an approach where the read-state changer 203 comprises a control circuit 301. This control circuit 301 comprises a part of the aforementioned RFID tag 200 and operably couples to the RFID transceiver 201. This control circuit 301 is configured (for example, via appropriate programming) to switch the RFID transceiver 201 from the quiescent read state to the readable state as described above.

Such a control circuit 301 can comprise a fixed-purpose hard-wired platform or can comprise a partially or wholly programmable platform. These architectural options are well known and understood in the art and require no further description here. By one approach (as when the control circuit 301 comprises, at least in part, a programmable platform), the control circuit 301 includes integral memory. This memory can serve, for example, to non-transitorily store the computer instructions that, when executed by the control circuit 301, cause the control circuit 301 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

Figure 4:
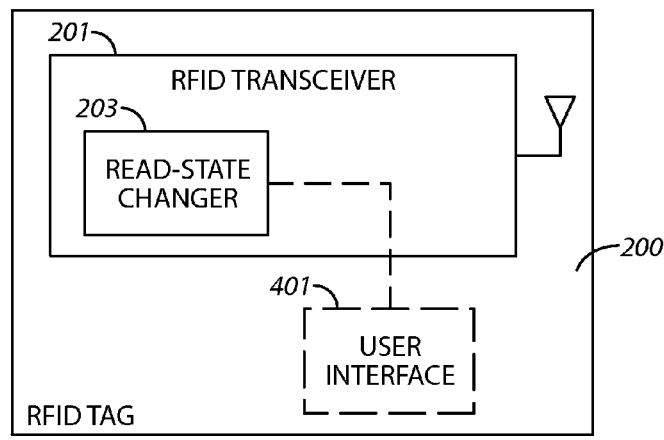
FIG. 4 comprises a block diagram as configured in accordance with various embodiments of the invention.

If desired, the RFID transceiver 201 can itself be configured to harbor the described switching functionality. As an example in these regards FIG. 4 presents an RFID transceiver 201 having an integral read-state changer 203. By having the read-state changer 203 as a portion of the RFID transceiver 201 itself, the RFID transceiver 201 can operate, for example, as a session 0 and/or a session 1 device per the EPC standard as regards persisting the quiescent read state even when the RFID transceiver 201 is read by an RFID-tag reader using either of session 2 or session 3 per that same standard. In particular, in accordance with sessions 0 or 1, the RFID transceiver 201 can automatically return to the readable state notwithstanding having been read in session 2 or 3 and placed in the B inventory state and notwithstanding the continued availability of reader power 202.

These configurations serve well when the read-state changer 203 serves to automatically switch the RFID transceiver 201 from the quiescent read state to the readable state (as a function, for example, of time, detected acceleration or changes to orientation, location, or other sensed parameter of interest). FIG. 4 also presents an optional approach that accommodates (in combination with an automated approach or in lieu thereof as desired) an ability to respond instead to a user.

In particular, FIG. 4 presents an RFID tag 200 that optionally includes at least one user interface 401 that operably couples to the read-state changer 203 (wherein the latter comprises, in this example, an integral part of the RFID transceiver 201 itself as described above). This user interface 401 can comprise, for example, a button that the user can selectively assert. Upon asserting the button the read-state changer 203 can then switch the RFID transceiver's read state as described above. Accordingly, such an approach can serve well in an application setting as described in the aforementioned METHOD AND APPARATUS PERTAINING TO RFID TAG-BASED USER ASSERTIONS.

Figure 5:
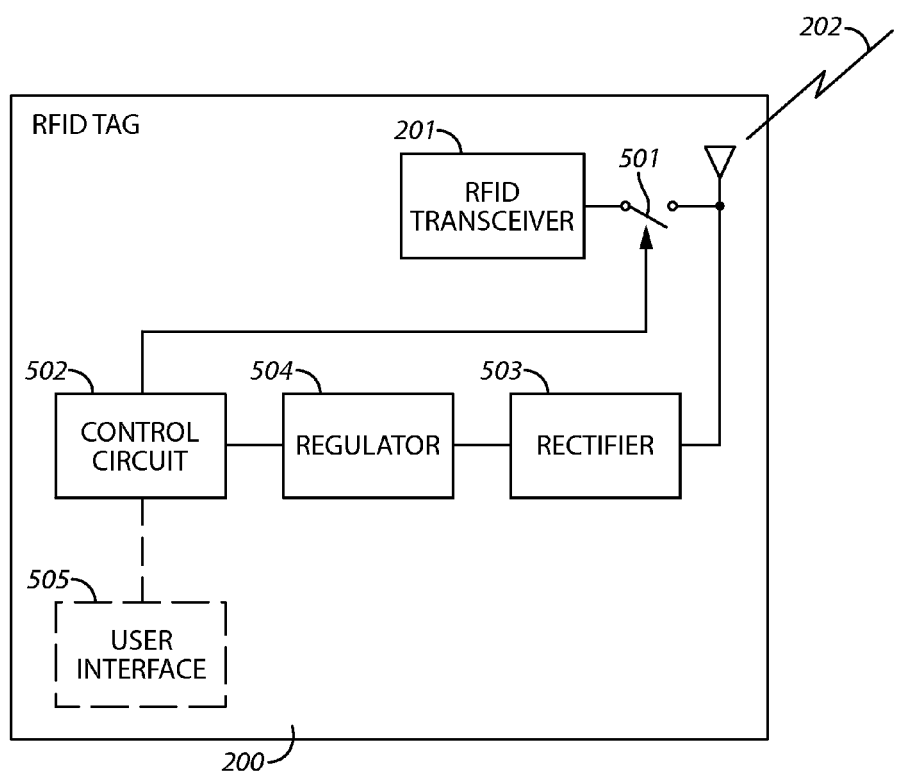
FIG. 5 comprises a block diagram as configured in accordance with various embodiments of the invention.

In the examples described above the read-state changer 203 communicates directly with the RFID transceiver 201. These teachings will accommodate other approaches in these regards, however. FIG. 5, for example, presents an approach that employs a switch 501 to decouple the RFID transceiver 201 from received reader-based power 202. This switch 501 is controlled in this example by a control circuit 502 that is configured as described above. Accordingly, this control circuit 502 may operate the switch 501 as a function, for example and at least in part, of time and/or in response to user assertions of an optional user interface 505 as described above.

RFID transceivers are often configured to harvest usable power from reader-based power. Accordingly, such RFID transceivers often include, for example, a rectifier and voltage regulator to convert the reader-based power into usable power for the purposes of the RFID transceiver. Pursuant to the described configuration, however, the RFID transceiver 201 is selectively decoupled from the received reader-based power 202 and hence will lose power. When this occurs for a sufficient duration of time (as per the specific design of the RFID transceiver itself), the RFID transceiver 201 will assume the aforementioned readable state (such as the A inventory state) upon again being re-powered.

By one approach, and as illustrated, a separate rectifier 503 and regulator 504 can serve to continue to provide power to the control circuit 502 to maintain its continuing functionality and operability. Other approaches are of course possible. For example, the RFID tag 200 may include only a single power-harvesting component/circuit. In that case, the power output from the power-harvesting component/ circuit can be configured to continuously power the control circuit 502 and to provide power to the RFID transceiver 201 via a control circuit-controlled switch to thereby achieve the same functional result as described above.

Figure 6:
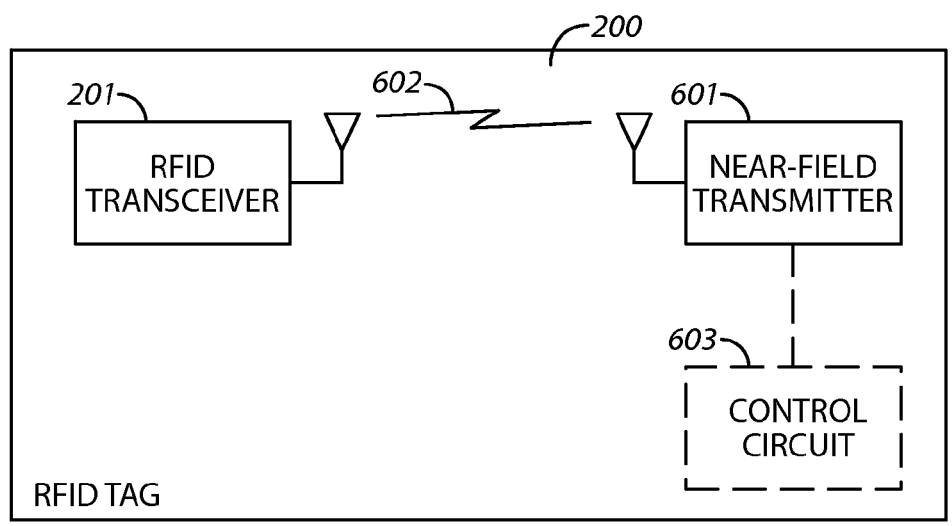
FIG. 6 comprises a block diagram as configured in accordance with various embodiments of the invention.

FIG. 6 presents yet another approach in these regards. In this example the RFID tag 200 includes a near-field transmitter 601 that is disposed operationally proximal to the RFID transceiver 201 such that the near-field transmissions 602 of the near-field transmitter 601 are compatibly received by the RFID transceiver 201 (but likely not by other nearby RFID tags). The near-field transmissions 602, in turn, can include signaling to cause the desired switch from the quiescent read state to the readable state. The aforementioned EPC standard, for example, accommodates so-called flags that can serve in these regards.

By one approach the near-field transmitter 601 is configured to automatically and repeatedly transmit the desired instruction(s) to the RFID transceiver 201. By another approach, if desired, an optional control circuit 603 as also comprises a part of the RFID tag 200 operably couples to the near-field transmitter 601 to selectively control the transmissions of the near-field transmitter 601. It would also be possible to include a user interface as described above to selectively prompt the desired near-field transmission 602.

So configured, an RFID tag can compatibly serve in an operating environment that presumes use of session 2 or session 3 RFID-tag readers, wherein selected RFID tags can nevertheless exhibit readability behavior that is more akin to session 0 or session 1 in some cases and that is without behavioral peer in other cases. Such an RFID tag can be read on a considerably more-frequent basis and hence can facilitate specialized purposes such RFID tag-based user devices of various kinds. These teachings are economically practiced and will readily scale to accommodate a wide variety of application settings and requirements.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. An apparatus comprising:
a radio-frequency identification (RFID) transceiver configured to automatically switch from a readable state to a quiescent read state upon being read and to remain in the quiescent read state while provisioned with reader-based power but to automatically revert from the quiescent read state to the readable state upon losing reader-based power for at least a particular length of time and then being re-powered with reader-based power;
a read-state changer disposed locally with respect to the RFID transceiver and configured to switch the RFID transceiver from the quiescent read state to the readable state notwithstanding current availability of the reader-based power, the read-state changer including:
a control circuit configured to switch the RFID transceiver from the quiescent read state to the readable state; and
a user interface that operably couples to the control circuit, such that the control circuit responds to a user assertion of the user interface by switching the RFID transceiver from the quiescent read state to the readable state.

2. The apparatus of claim 1 wherein the apparatus comprises an RFID tag.

3. The apparatus of claim 1 wherein the RFID transceiver is configured to be read by a reader that uses either of session 2 and session 3 per a standard denoted as EPC Radio- Frequency Identity Protocols Class-1 Generation-2 UHF RFID Protocol for Communications at 860 MHz-960 MHz Version 1.0.9 ("the standard").

4. The apparatus of claim 3 wherein the read-state changer comprises a portion of the RFID transceiver that is configured to operate as at least one of session 0 and session 1 per the standard as regards persisting the quiescent read state even when the RFID transceiver is read using either of session 2 and session 3 per the standard.

5. The apparatus of claim 1 wherein the read-state changer comprises, at least in part, a switch to disconnect rectified power generated from the reader-based power provisioned by the RFID transceiver sufficient to cause the RFID transceiver to assume the readable state upon again be re-powered.

6. A method comprising:
providing a radio-frequency identification (RFID) transceiver configured to automatically switch from a readable state to a quiescent read state upon being read and to remain in the quiescent read state while provisioned with reader-based power but to automatically revert from the quiescent read state to the readable state upon losing reader-based power for at least a particular length of time and then being re-powered with reader-based power;
using a control circuit that is local to the RFID transceiver to locally switch the RFID transceiver from the quiescent read state to the readable state upon detecting a user assertion of a user interface that is also local to the RFID transceiver and that operably couples to the control circuit, notwithstanding current availability of the reader-based power.

7. The method of claim 6 wherein the RFID transceiver is configured to be read by a reader that uses either of session 2 and session 3 per a standard denoted as EPC Radio-Frequency Identity Protocols Class-1 Generation-2 UHF RFID Protocol for Communications at 860 MHz-960 MHz Version 11.0.9 ("the standard").

8. The method of claim 7 wherein locally switching the RFID transceiver comprises operating the RFID transceiver as at least one of session 0 and session 1 per the standard as regards persisting the quiescent read state even when the RFID transceiver is read using either of session 2 and session 3 per the standard.

9. The method of claim 6 wherein locally switching the RFID transceiver comprises, at least in part, using a switch to disconnect rectified power generated from the reader-based power provisioned by the RFID transceiver sufficient to cause the RFID transceiver to assume the readable state upon again be re-powered.

* * * * *